United States Patent [19]

Haas et al.

[11] Patent Number: 4,644,017

[45] Date of Patent: Feb. 17, 1987

[54] PROCESS FOR THE PRODUCTION OF POLYISOCYANATE ADDITION PRODUCTS AND COMPOSITE POLYISOCYANATE ADDITION PRODUCTS

[75] Inventors: Peter Haas, Haan, Fed. Rep. of Germany; Hans-Albrecht Freitag, Coraopolis, Pa.; Geza Avar, Leverkusen, Fed. Rep. of Germany; Claus-Dieter Sommerfeld, Much, Fed. Rep. of Germany; Hans-Walter Illger, Roesrath, Fed. Rep. of Germany

[73] Assignee: Bayer Aktiengesellschaft, Leverkusen, Fed. Rep. of Germany

[21] Appl. No.: 775,274

[22] Filed: Sep. 12, 1985

[30] Foreign Application Priority Data

Sep. 25, 1984 [DE] Fed. Rep. of Germany ....... 3435070

[51] Int. Cl.$^4$ ............................................. C08G 18/14
[52] U.S. Cl. .................................. 521/129; 427/385.5; 427/389; 427/389.9; 427/393.5; 428/423.1; 428/423.3; 428/423.5; 428/423.7; 428/424.2; 428/424.4; 428/424.6; 428/424.7; 428/424.8; 428/425.1; 521/137; 525/185; 525/424; 525/440; 525/454; 528/53
[58] Field of Search ........................... 521/129; 528/53; 427/385.5, 389, 389.9, 393.5; 428/423.1, 423.3, 423.5, 423.7, 424.2, 424.4, 424.6, 424.7, 424.8, 425.1

[56] References Cited

U.S. PATENT DOCUMENTS 4,094,827 6/1978 McEntire ........................... 521/129
4,237,282 12/1980 Speranza et al. ................... 521/129

Primary Examiner—Maurice J. Welsh
Attorney, Agent, or Firm—Gene Harsh; Joseph C. Gil; Lyndanne M. Whalen

[57] ABSTRACT

Composite polyisocyanate addition products are formed from (1) the reaction product of a compound having at least two isocyanate-reactive hydrogen atoms and a molecular weight of from 400 to 10,000, a polyisocyanate and a catalyst which is a diffusion stable amino alkyl urea having tertiary amino groups and corresponds to the formula

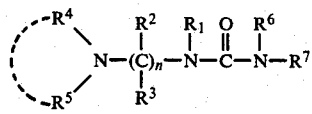

in which $R^1$, $R^2$, $R^3$, $R^4$, $R^5$, $R^6$, $R^7$ and n each represent specified groups or values and (2) another different material such as polyvinyl chloride, ABS, lacquers and textiles. Known additives such as blowing agents, chain extenders and foam stabilizers may optionally be used in the production of reaction product (1). The composite materials of the present invention which are particularly useful in the production of bedding and seating furniture, seats used in transport means, dashboard panels, arm-rests and for other similar applications are characterized by their lack of discoloration due to the diffusion of the catalyst employed in producing reaction product (1).

23 Claims, No Drawings

PROCESS FOR THE PRODUCTION OF POLYISOCYANATE ADDITION PRODUCTS AND COMPOSITE POLYISOCYANATE ADDITION PRODUCTS

BACKGROUND OF THE INVENTION

The present invention relates to polyisocyanate addition products and to composite polyisocyanate addition products and processes for their production.

The production of polyurethanes with the aid of various types of catalysts is known. In the production of polyurethane composite materials and polyurethanes made up with other materials (such as polyurethane foams covered with colored polyvinyl chloride or ABS foils or with textile coverings of cotton or leather), it has often been found that the catalysts used to produce the polyurethane damage the covering materials due to diffusion. For example, the lacquer used in furniture manufactured from molded foam parts and lacquered wood (such as chairs and sofas) in which the lacquered wood is visible may be damaged considerably by the catalyst used to produce the foam, especially in warm weather. Softening and discoloration of nitrocellulose lacquers is particularly likely to occur. Yellowing of leather and light colored textile coverings of polyurethanes (especially those based on cotton) is also known to occur as a result of diffusion of the catalyst used to produce the foam.

In the field of foam-backed foils based on PVC and ABS, distinct color changes are observed in the covering and lining materials due to separation of the activators. These changes may result in a very dark or even black discoloration even if the foils were originally light in color.

SUMMARY OF THE INVENTION

It is an object of the present invention to provide catalysts for the production of polyisocyanate addition products which catalysts would not diffuse, would not produce discoloration in covering materials due to direct contact and would prevent indirect changes in color and constitution of adjacent materials due to continued separation of the catalysts even when the composite material is exposed to heat.

It is also an object of the present invention to provide a process for the production of composite polyisocyanate addition products in which the catalyst employed to produce the polyisocyanate addition product does not cause discoloration of the material in contact with that polyisocyanate addition product.

It is also an object of the present invention to provide composite polyisocyanate addition products which do not discolor.

These and other objects which will be apparent to those skilled in the art are accomplished by reacting a compound having at least two isocyanate-reactive hydrogen atoms and a molecular weight of from 400 to 10,000 with a polyisocyanate in the presence of a catalyst which is a diffusion stable amino alkyl urea having tertiary amino groups and corresponding to the formula

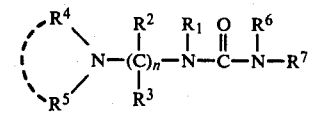

in which $R^1$, $R^2$, $R^3$, $R^4$, $R^5$, $R^6$, $R^7$ and n represent the groups or values specified below to form a polyisocyanate addition product. This polyisocyanate addition product is then combined with or applied to another different material (preferably in the form of a foil, covering or edging) to form the composite polyisocyanate addition product.

DETAILED DESCRIPTION OF THE INVENTION

The present invention relates to a process for the production of optionally foamed polyisocyanate addition products such as polyurethanes which are combined with or applied to another material. More specifically, a compound having a molecular weight of from 400 to 10,000 containing at least two isocyanate reactive hydrogen atoms is reacted with a polyisocyanate in the presence of a catalyst containing tertiary amino groups and optionally in the presence of chain lengthening agents having molecular weights of 32 to 400, foam stabilizers, water and/or organic blowing agents and optionally other auxiliary agents and additives. The resulting product is then combined with or applied to another material. The catalysts used in this process are amino alkyl ureas corresponding to the general formula

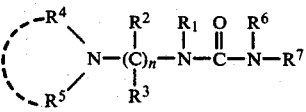

in which
$R^1$ represents hydrogen or the group

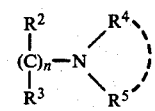

n represents an integer from 2 to 6,
$R^2$ and $R^3$ each represent hydrogen or a $C_1$–$C_6$ alkyl group,
$R^4$ and $R^5$ each represent a $C_1$–$C_6$ alkyl group or together represent a $C_2$–$C_6$ alkylene group which may contain heteroatoms (such as oxygen) or the group

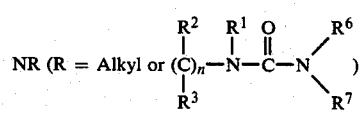

and
$R^6$ and $R^7$ which may be the same or different each represent hydrogen or the group

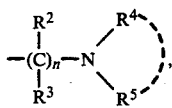

The materials with which the polyisocyanate addition product may be combined or to which the polyisocyanate addition product may be applied are preferably PVC, ABS, mixtures of PVC and ABS, polyvinyl acetate, polyvinyl butyral, copolymers and homopolymers based on vinyl chloride, styrene, butadiene, isoprene, chloroprene, dichlorobutadiene, ethylene, propene, acrylonitrile and the chlorination and chlorosulfonation derivatives thereof in the form of foils, coverings and edgings with different color shades. Lacquers based on cellulose esters (such as cellulose nitrates, cellulose acetates, cellulose butyl esters) and cellulose ethers, polyester resins, epoxide resins, alkyd resins, oil lacquers, lacquers which are combinations of these components and textiles based on cotton or leather may also be used.

In the above-given general formula, it is preferred that $R^1$, $R^2$, $R^3$, $R^6$ and $R^7$ each represent hydrogen, $R^4$ and $R^5$ each represent a methyl group and n represents 2 or 3.

Some of the ureas useful in the present invention are disclosed as being useful catalysts for the preparation of polyurethanes in German Offenlegungsschrift No. 2,354,952 and in U.S. Pat. Nos. 4,094,827 and 4,194,069. However, it is surprising that the ureas used in accordance with the present invention prevent discoloration due to contact between the polyurethane and covering materials such as PVC, ABS, textiles and leather. Damage of lacquer surfaces adjacent to the polyurethane in polyurethane composite materials is also unexpectedly avoided.

The ureas useful in the present invention are medium viscosity, water clear liquids at room temperature, with only a very slight odor which is not noticeable even when the foams are hot. These ureas are generally used in a quantity of from 0.1 to 10 parts by weight, preferably from 0.5 to 5 parts by weight (optionally as mixtures with each other), based on 100 parts by weight of the compound(s) having at least 2 isocyanate-reactive hydrogen atoms.

The following are specific examples of ureas useful in the practice of the present invention:

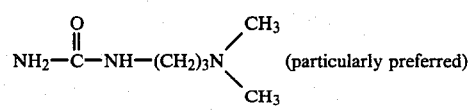
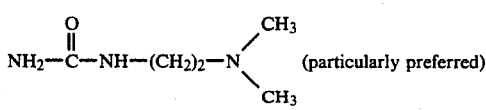
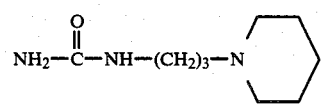
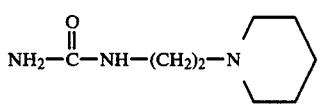
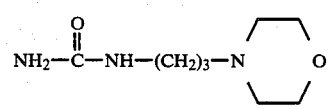
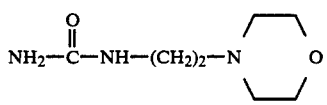
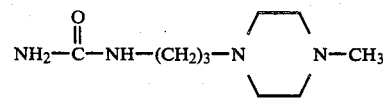
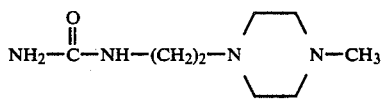
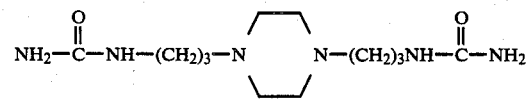
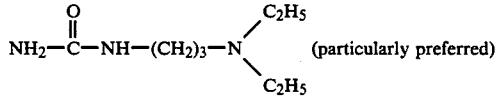
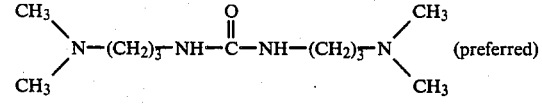
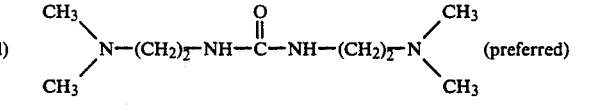
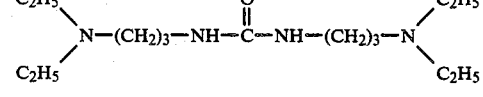
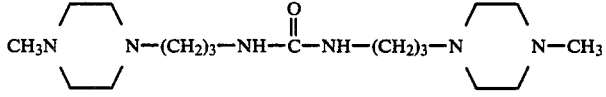
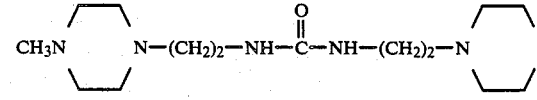
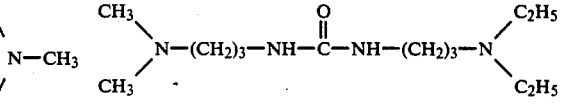

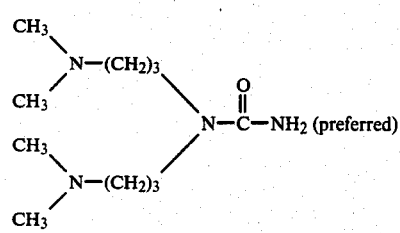

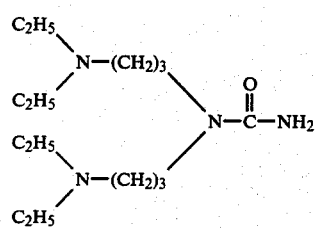

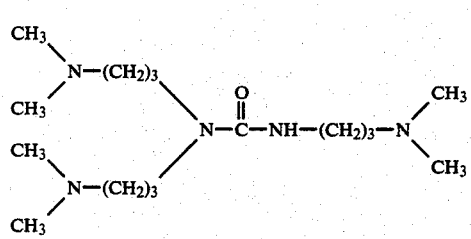

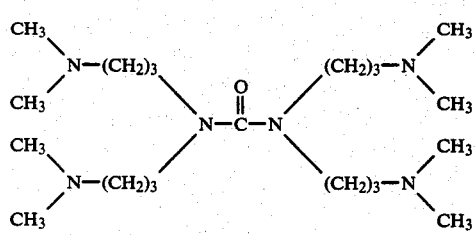

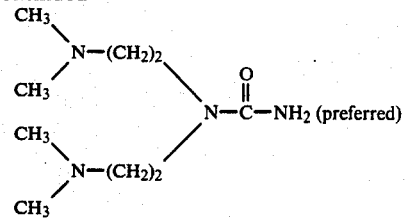

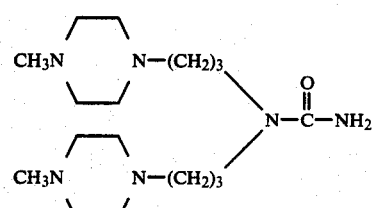

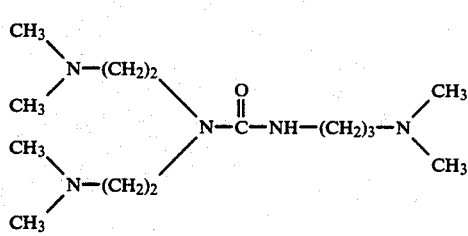

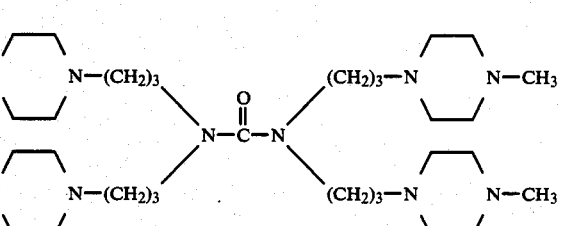

The catalysts of the present invention which preferably have 2 hydrogen atoms and most preferably 3 hydrogen atoms on the nitrogen atoms of the urea group, may be prepared, for example, by the reaction of urea with the corresponding amines at temperatures of from 80° to 150° C., preferably from 100° to 130° C. with ammonia being driven off.

The following are examples of amines useful as starting materials for the synthesis of the urea catalysts for the present invention:

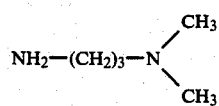

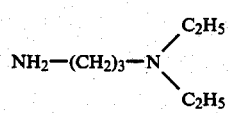

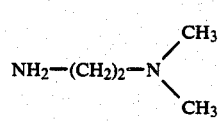

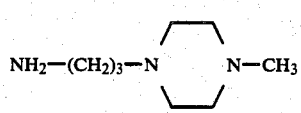

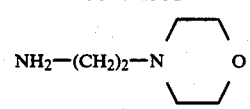

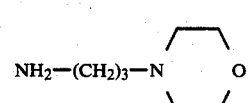

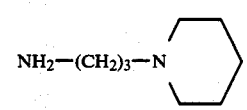

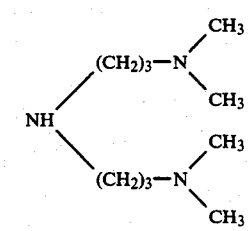

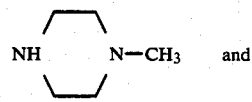 and

-continued

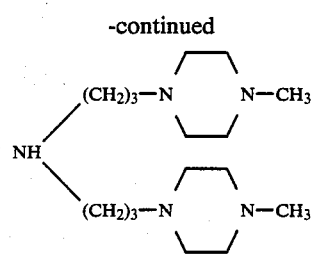

The conversion ratio of the starting amines to urea is generally in the range from 2:1 to 1:1. The conversion ratio is preferably 2:1, most preferably 1:1. Amine mixtures may, of course, also be used. The isocyanates which may be used in the production of the polyisocyanate addition products particularly polyurethanes which are optionally cellular or microcellular include aliphatic, cycloaliphatic, araliphatic, aromatic and heterocyclic polyisocyanates such as those described e.g., by W. Siefken in Justus Liebigs Annalen der Chemie, 362, pages 75 to 136, for example, those of the formula:

$Q(NCO)_n$ in which
n=2-4, preferably 2, and
Q represents an aliphatic hydrocarbon group with 2-18 (preferably 6-10) carbon atoms, a cycloaliphatic hydrocarbon with 4-15 (preferably 5-10) carbon atoms, an aromatic hydrocarbon group with 6-15 (preferably 6-13) carbon atoms, or an araliphatic hydrocarbon group with 8-15 (preferably 8-13) carbon atoms.

Such polyisocyanates are described in German Offenlegungsschrift No. 2,832,253 on pages 10-11.

Particularly preferred isocyanates are the easily accessible polyisocyanates such as 2,4- and 2,6-tolylene diisocyanate and any mixtures of these isomers ("TDI"); polyphenyl-polymethylene polyisocyanates, such as may be prepared by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates"), particularly those modified polyisocyanates which are derived from 2,4- and/or 2,6-tolylene diisocyanate or from 4,4'- and/or 2,4'-diphenylmethane diisocyanate.

The compounds having a molecular weight of from 400 to 10,000, containing at least 2 isocyanate-reactive hydrogen atoms which may be used to produce the polyisocyanate addition products of the present invention include not only compounds containing amino groups, thiol groups or carboxyl groups but also compounds containing hydroxyl groups (especially those which have 2-8 hydroxyl groups), particularly those with molecular weights of from 1,000 to 6,000 (preferably from 2,000 to 6,000). Polyesters, polyethers, polythioesters, polyacetals, polycarbonates and polyester amides containing at least 2, generally 2-8, preferably 2-6 hydroxyl groups such as those known to be useful in the production of homogeneous and cellular polyurethanes (described e.g., in German Offenlegungsschrift No. 2,832,253, pages 11-18) are most preferred.

Compounds with a molecular weight of from 32 to 400 containing at least 2 isocyanate-reactive hydrogen atoms which may optionally be used in the present invention include compounds containing hydroxyl groups and/or amino groups and/or thiol groups and-/or carboxyl groups, preferably compounds containing hydroxyl groups and/or amino groups which serve as chain lengthening agents or crosslinking agents. These compounds generally have 2-8, preferably 2-4 isocyanate-reactive hydrogen atoms. Specific examples of these materials are given in German Offenlegungsschrift No. 2,832,253 at pages 19-20.

Auxiliary agents and additives which may also be used as optional components in the present invention include water and/or readily volatile organic substances as blowing agents; catalysts of known type, in quantities of up to 50 wt %, based on the quantity of catalyst to be used according to the invention; surface active additives such as emulsifiers and foam stabilizers; reaction retarders, e.g., substances which are acid in reaction, such as hydrochloric acid or organic acid halides; or known cell regulators such as paraffins of fatty alcohols or dimethyl polysiloxanes; pigments, dyes and known flame retarding agents (e.g., tris-chloroethyl phosphate or tricresyl phosphate); stabilizers against ageing and weathering; plasticizers; fungistatic and bacteriostatic substances; and fillers such as barium sulfate, kieselguhr, carbon black or whiting.

Specific examples of such auxiliary agents and additives which may optionally be used are described, for example, in German Offenlegungsschrift No. 2,732,292 at pages 21 through 24.

Other examples of surface active additives and foam stabilizers, as well as cell regulators, reaction retarders, stabilizers, flame retarding substances, plasticizers, dyes, fillers and fungistatic and bacteriostatic substances and details concerning the use and mode of action of these additives, are described in Kunststoff-Handbuch, Vol. VII, published by Vieweg and Höchtlen, Carl-Hanser-Verlag, Munich 1966, e.g., on pages 103–113.

To produce the polyurethane composite materials or made up polyurethane products of the present invention the polyurethanes obtained are processed in known manner with other materials which form, for example, coatings, covering layers or lacquer coats on the polyurethane.

Combining the different materials to produce the composite material may be carried out simultaneously with the production of the polyisocyanate addition product such as polyurethane, e.g., by the back filling technique, or it may be carried out after production of the polyurethane. Making up or finishing of the polyurethane, e.g., covering it with leather or textiles, is generally carried out after production of the polyurethane, using known methods.

Examples of materials with which the polyisocyanate addition product is combined include polyvinyl chloride in various color shades, polyvinyl acetate, ABS copolymers in various color shades, combinations of PVC and ABS, other co- and homopolymers based on vinyl chloride, styrene, butadiene, isoprene, chloroprene, dichlorobutadiene, ethylene, propylene, acrylonitrile and their chlorination and chlorosulfonation derivatives, in the form of foils, coatings or edgings. Lacquers based on cellulose esters such as cellulose nitrates, cellulose acetates, cellulose butyl esters or cellulose ethers, polyester resins, epoxide resins, alkyd resins, oil resin lacquer or combination lacquers of these components may also be used. The polyurethane foams which are obtained with the aid of the catalyst according to the invention and which may be flexible, semi-rigid or rigid, also prevent yellowing of textiles used as covering materials, e.g., cotton coverings and light colored leather.

The components for the polyisocyanate addition reaction may be reacted together by the known one-shot process, prepolymer process or semi-prepolymer process using mechanical devices such as those described in U.S. Pat. No. 2,764,565. Details concerning other processing apparatus which may also be used according to the invention are given in Kunststoff-Handbuch, Vol. VII, published by Vieweg and Höchtlen, Carl-Hanser-Verlag, Munich 1966, e.g., on pages 121-205.

In the production of foam, foaming is preferably carried out in closed molds with the reaction mixture being introduced into a mold which may be made of a metal (e.g., aluminum) or a synthetic resin (e.g., an epoxide resin). The foamable reaction mixture foams up inside the mold to form the molded product. This foaming in the mold may be carried out in such a manner that the molded product has a cellular structure on its surface or it may be carried out to produce a molded product having a compact skin and a cellular core. The quantity of foamable reaction mixture introduced into the mold may be just sufficient to fill the mold with foam. Alternatively, a larger quantity of foamable reaction mixture may be introduced into the mold than is necessary for filling the interior of the mold with foam. The last mentioned method is known as "over-charging". This procedure is described, for example, in U.S. Pat. Nos. 3,178,490 and 3,182,104.

In the preferred method of foaming in the mold, known "external mold release agents" such as silicone oils, are frequently used, but "internal mold release agents" may also be used, optionally together with external mold release agents. Such release agents are disclosed, for example, in German Offenlegungsschriften Nos. 2,121,670 and 2,307,589.

It is in many cases preferred to produce molded foams which are foamed in a mold tempered at a constant temperature or in an unheated mold (cold setting foams). Such methods are described in G.B. Pat. No. 1,162,517 and German Offenlegungsschrift No. 2,153,086.

Foams may, of course, also be produced by foaming in a block or by the known laminator process.

The polyurethanes obtained in accordance with the present invention, combined or made up with other materials, may be used, for example, as dashboard panels, arm rests, sun-roofs in cars, refrigeration units, bedding and seating furniture, mattresses, headrests, and seats used in transport means such as motor vehicles, trains and aircraft.

The invention is further illustrated, but is not intended to be limited by the following examples in which all parts and percentages are by weight unless otherwise specified.

EXAMPLES

Synthesis of urea catalysts

Catalyst A 30.0 kg of urea and 50.0 kg of 3-dimethylaminopropylamine were heated to 100° C. with stirring. $NH_3$ was driven off until a temperature of 115° C. was reached. When evolution of gas had ceased, the reaction mixture was cooled to 80° C. and treated under vacuum to a final pressure of 5 mbar.

Yield: 71 kg, viscosity: 5,000 mPas (25° C.).
Molecular weight by titration: 146.

Analysis for $C_6H_{15}H_3O$ (145) calculated: C: 49.7; H: 10.3; N: 28.9; found: C: 50.0; H: 10.0; N: 28.1.

Catalyst B 120 g of urea and 232 g of N,N-diethyl-1,2-ethanediamine were heated to 120° C. until no further evolution of $NH_3$ took place. A vacuum was applied at 80° C. until a final pressure of 5 mbar was obtained. The reaction mixture was then cooled.

Yield: 310 g.
Molecular weight by titration: 144 (calculated 159).

Catalyst C 120 g of urea and 260 g of N,N-diethyl-1,3-propane diamine were heated to 120° C. until evolution of $NH_3$ ceased. A vacuum was then applied at 80° C. until a final pressure of 5 mbar was obtained. The product was poured out.

Yield: 335 g.
Molecular weight by titration: 168 (calculated 173).

Catalyst D 120 g of urea and 408 g of 3-dimethylaminopropylamine were heated to 140° C. until evolution of $NH_3$ ceased. Constituents with a low volatility were drawn off under vacuum to a final pressure of 5 mbar.

Yield: 430 g.
Molecular weight as determined by titration of the molar mass: 238 (calculated 230).
Viscosity 300 mPas (25° C.).

Catalyst E 120 g of urea and 520 g of 1-amino-3-diethylamino propane were heated to 120° C. until evolution of $NH_3$ ceased. Constituents with a low volatility were drawn off under vacuum until a final pressure of 5 mbar was obtained.

Yield: 555 g.
Molecular weight as determined by titration: 275 (calculated 286)

Catalyst F 120 g of urea and 464 g of 1-amino-2-diethylamino ethane were heated to 140° C. until evolution of $NH_3$ ceased. Constituents with a low volatility were drawn off under vacuum to a final pressure of 5 mbar.

Yield: 490 g.
Molecular weight as determined by titration: 250 (calculated 258).

Testing Procedure

Molded polyurethane foam boxes with a volume of 4 liters were produced from each of the formulations given in Table 1 at a molding temperature of 40° C. in the manner described below. Lacquered wooden boards measuring $70 \times 100 \times 10$ mm were fixed to these molded parts with the lacquer side facing the foam. The lacquer used was a commercial nitrocellulose combination lacquer (NC lacquer) which is used very frequently for lacquering the visible wooden parts of upholstered furniture. The samples were stored for several days at 40° C. and the changes were recorded.

The effect on lacquered wooden parts which incorporate or are made up with polyurethane molded parts was produced by the wick action of the materials for the transport of the diffusing catalyst to the lacquer parts.

The chosen technique of direct contact of the foam with the lacquer part merely showed the damage more rapidly. In other words, catalysts which are effective within the meaning of the invention were tested under drastic conditions.

TABLE 1

| Formulation | I | II | III | IV | V | VI |
|---|---|---|---|---|---|---|
| Trifunctional polyether, OH number 56, obtained by the addition of PO/EO (87:13) to trimethylol propane (pbw) | 100 | 100 | 100 | 100 | 100 | 100 |
| water (pbw) | 3.0 | 3.0 | 3.0 | 3.0 | 3.0 | 3.0 |
| Commercial siloxane stabilizer B 4617 of Goldschmidt AG (pbw) | 1.0 | 1.0 | 1.0 | 1.0 | 1.0 | 1.0 |
| Triethylamine (pbw) | 1.5 | — | — | — | — | — |
| Tetramethyl hexamethylene diamine (pbw) | — | 0.8 | — | — | — | — |
| Dicyclohexyl methylamine (pbw) | — | — | 3.0 | — | — | — |
| Catalyst A (pbw) | — | — | — | 1.6 | — | — |
| Catalyst B (pbw) | — | — | — | — | 1.7 | — |
| Dimethylamino propyl formamide (not according to the invention) (pbw) | — | — | — | — | — | 1.6 |

Each of the formulations given in Table 1 was mixed with 35.2 parts of an isocyanate having an isocyanate content of 44.5%, consisting of 80% of a mixture of 2,4- and 2,6-tolylene diisocyanate (80:20) and 20% of a polyphenyl polymethylene polyisocyanate obtained by the phosgenation of an aniline/formaldehyde condensate. The mixture was poured into the mold. The results of the lacquer test for each of the products (identified by the same Roman numeral as that of the Formulation given in Table 1 from which the product was formed) are given in Table 2.

TABLE 2

| Storage of samples: molded part | 144 hours at 40° C. | | | | | |
|---|---|---|---|---|---|---|
| | I | II | III | IV | V | VI |
| Lacquer yellowing | 2 | 3 | 3 | 1 | 1 | 4 |
| Lacquer softening | 2 | 2 | 1 | 1 | 1 | 4 |

Assessment scale:
1. completely unchange, corresponding to blank sample.
2. slight change.
3. medium change.
4. pronounced change.

In Examples I to VI, the catalysts were used in differing quantities according to their activating effect. The examples of the formulations for molded parts according to IV and V clearly show the superiority of the catalysts of the present invention with respect to discoloration by contact. Such lack of discoloration is achieved only with urea catalysts A and B under the drastic conditions of direct contact with the lacquer.

Tests of PVC foils back foamed with semi-rigid polyurethane foams 90 g of a polyether having a molecular weight of 4800 which was obtained by the chemical addition of propylene oxide (87%) and ethylene oxide (13%) to trimethylol propane, 2.5 g of water, 2 g of tall oil and 0.4 g of the catalysts mentioned below were mixed with 47 g of a polyphenyl-polymethylene polyisocyanate which had been obtained by the phosgenation of an aniline/formaldehyde condensate and had an isocyanate content of 31 wt %. The mixture was then introduced into the mold.

A commercial PVC foil about 0.7 mm in thickness which had not been colored was placed in a metal plate mold measuring 20×20×4 cm which could be tempered. The foil was back filled mechanically with the mixture described above. The product was removed from the mold after a reaction and hardening time of 5 min.

The molded parts obtained were tempered separately in a circulating air drying cupboard at 120° C. The results obtained are reported in Table 3.

TABLE 3

| Catalyst | 8 h Color change | 18 h at 120° C. |
|---|---|---|
| 1. Diaza-bicyclo-2,2,2-octane | Very severely discolored | total discoloration |
| 2. 2,2'-dimethylamino diethyl ether | reddish discoloration | very severely discolored |
| 3. Catalyst A | no discoloration | very slight discoloration |
| 4. Catalyst D | no discoloration | very slight discoloration |
| 5. dimethylaminopropyl-formamide (not according to the invention) | medium discoloration | very severe discoloration |
| PVC foil, colorless (comparison test) | no discoloration | slight discoloration |

These results also confirm that contact discoloration by semi-rigid foams which have been activated with the urea catalysts of the present invention is prevented.

In the case of colored foils, the color changes become apparent only after considerably longer periods.

When back foaming was carried out using the above-described procedure and materials with the exception that the uncolored foil was replaced with a blue PVC foil 0.7 mm in thickness (used for motor car fittings), the following results were obtained by tempering at 120° C.

| Catalyst | 72 h | 168 h | 288 h | 336 h | 504 h |
|---|---|---|---|---|---|
| 1. Diaza-bicyclo-2,2,2-octane | black | black | black | black | black |
| 2. 2,2'-dimethyl-aminodiethyl-ether | blue-black | blue-black | black | black | black |
| 3. Catalyst A | blue | blue | blue | blue | predominantly blue |
| 4. Catalyst D | blue | blue | blue | blue | predominantly blue |
| 5. Dimethylamino-propyl formamide (not according to the invention) | blue-black | black | black | black | black |
| Blue PVC foil (comparison test) | blue | * | | | |

*After 168 h, the foil became covered with silver spots but the basic blue color was preserved. This phenomenon did not occur with the catalyst of the present invention.

In the case of the blue colored, back foamed PVC foil, urea Catalysts A and D (according to the invention) also prevented contact discoloration of the foil which would otherwise occur and provided additional stabilization.

The effects described even occur at low temperatures. For this reason, the edges of deep-freeze chests, which are for the most part manufactured from PVC, are often colored to overcome the problem of contact discoloration.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a composite polyisocyanate addition product in which a compound having at least two isocyanate-reactive hydrogen atoms and a molecular weight of from 400 to 10,000 is reacted with a polyisocyanate in the presence of a catalyst which is a diffusion stable amino alkyl urea having tertiary amino groups and corresponds to the formula $$\begin{array}{c} R^4 \\ \phantom{x} \diagdown \\ \phantom{xx} N-(C)_n-N-C-N-R^7 \\ \phantom{x} \diagup \phantom{xxx} | \phantom{xx} | \phantom{xx} \| \phantom{xx} | \\ R^5 \phantom{xxxx} R^3 \phantom{xx} R^2 R^1 O R^6 \end{array}$$

in which
R$^1$ represents hydrogen,
R$^2$ and R$^3$ each represent hydrogen or a C$_1$–C$_6$ alkyl group,
R$^4$ and R$^5$ each represent a C$_1$–C$_6$ alkyl group or together represent a C$_2$–C$_6$ alkylene group which may contain heteroatoms or the group NR in which R represents an alkyl group or the group $$-(C)_n-N-C-N\begin{array}{c}R^6 \\ \diagup \\ \diagdown \\ R^7\end{array}$$

R$^6$ and R$^7$ each represent hydrogen and
n represents an integer from 2 to 6,
to form a polyisocyanate addition product which addition product is combined with, coated with or applied to another different material.

2. The process of claim 1 in which a material selected from the group consisting of chain lengthening agents having a molecular weight of from 32 to 400, foam stabilizers, water, organic blowing agents and combinations thereof is included in the reaction mixture.

3. The process of claim 1 in which R$^4$ and R$^5$ together represent a C$_2$–C$_6$ alkylene group containing oxygen or nitrogen.

4. The process of claim 1 in which R$^1$, R$^2$, R$^3$, R$^6$ and R$^7$ each represent hydrogen, R$^4$ and R$^5$ each represent a methyl group and n represents 2 or 3.

5. The process of claim 1 in which the catalyst corresponds to the formula $$\begin{array}{c}H_3C \\ \diagdown \\ \phantom{xx} N-(CH_2)_n-NH-\overset{O}{\overset{\|}{C}}-NH_2 \\ \diagup \\ H_3C\end{array}$$

in which n represents 2 or 3.

6. A process for the production of a polyisocyanate addition composite product or a polyisocyanate addition product which is covered with a different material comprising (a) reacting a compound having at least two isocyanate-reactive hydrogen atoms and a molecular weight of from 400 to 10,000 with a polyisocyanate in the presence of a catalyst which is a diffusion stable amino alkyl urea having tertiary amino groups corresponding to the formula $$\begin{array}{c} R^4 \\ \phantom{x} \diagdown \\ \phantom{xx} N-(C)_n-N-C-N-R^7 \\ \phantom{x} \diagup \phantom{xxx} | \phantom{xx} | \phantom{xx} \| \phantom{xx} | \\ R^5 \phantom{xxxx} R^3 \phantom{xx} R^2 R^1 O R^6 \end{array}$$

in which
R$^1$ represents hydrogen,
R$^2$ and R$^3$ each represent hydrogen or a C$_1$–C$_6$ alkyl group,
R$^4$ and R$^5$ each represent a C$_1$–C$_6$ alkyl group or together represent a C$_2$–C$_6$ alkylene group which may contain heteroatoms or the group NR in which R represents an alkyl group or the group $$-(C)_n-N-C-N\begin{array}{c}R^6 \\ \diagup \\ \diagdown \\ R^7\end{array}$$

R$^6$ and R$^7$ each represent hydrogen and
n represents an integer from 2 to 6,
to form a polyisocyanate addition product and
(b) combining the polyisocyanate addition product of (a) with another material selected from the group consisting of polyvinyl chlorides, ABS, mixtures of polyvinyl chlorides and ABS, polyvinyl acetates, polyvinyl butyrals, copolymers and homopolymers based on vinylchlorides, styrene, butadiene chloroprene, dichlorobutadiene, ethylene propene, acrylonitrile and the chlorination and chlorosulfonation derivatives thereof, lacquers based on cellulose esters, cellulose ethers, polyester resins, epoxide resins, alkyd resins, oil lacquers, textiles and any combinations thereof which material is in the form of a foil, covering or edging.

7. A process for the production of a foamed composite polyisocyanate addition product in which a compound having at least two isocyanate-reactive hydrogen atoms and a molecular weight of from 400 to 10,000 is reacted with a polyisocyanate in the presence of a catalyst which is a diffusion stable amino alkyl urea having tertiary amino groups corresponding to the formula $$\begin{array}{c} R^4 \\ \phantom{x} \diagdown \\ \phantom{xx} N-(C)_n-N-C-N-R^7 \\ \phantom{x} \diagup \phantom{xxx} | \phantom{xx} | \phantom{xx} \| \phantom{xx} | \\ R^5 \phantom{xxxx} R^3 \phantom{xx} R^2 R^1 O R^6 \end{array}$$

in which
R$^1$ represents hydrogen,
R$^2$ and R$^3$ each represent hydrogen or a C$_1$–C$_6$ alkyl group,
R$^4$ and R$^5$ each represent a C$_1$–C$_6$ alkyl group or together represent a C$_2$–C$_6$ alkylene group which may contain heteroatoms or the group NR in which R represents an alkyl group or the group

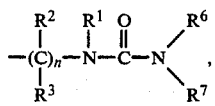

R⁶ and R⁷ each represent hydrogen and n represents an integer from 2 to 6, a blowing agent and a material selected from the group consisting of polyvinyl chlorides, ABS, mixtures of polyvinyl chlorides and ABS, polyvinyl acetates, polyvinyl butyrals, copolymers and homopolymers based on vinyl chloride, styrene, butadiene, isoprene, chloroprene, dichlorobutadiene, ethylene, propene, acrylonitrile and the chlorination and chlorosulfonation derivatives thereof, lacquers based on cellulose esters and cellulose ethers, polyester resins, epoxide resins, alkyd resins, oil lacquers, textiles and any combinations thereof in a mold in a single step.

8. The composite polyisocyanate addition product produced by the process of claim 6.

9. The composite polyisocyanate addition product produced by the process of claim 7.

10. A process for the production of a composite polyisocyanate addition product in which a compound having at least two isocyanate-reactive hydrogen atoms and a molecular weight of from 400 to 10,000 is reacted with a polyisocyanate in the presence of a catalyst which is a diffusion stable amino alkyl urea having tertiary amino groups and corresponds to the formula

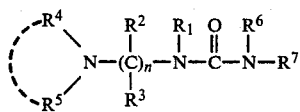

in which

R¹ represents the group

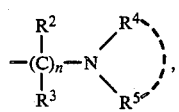

R² and R³ each represent hydrogen or a C₁-C₆ alkyl group,

R⁴ and R⁵ together represent a C₂-C₆ alkylene group which may contain heteroatoms or the group NR in which R represents an alkyl group or the group

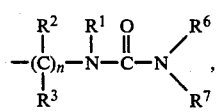

R⁶ and R⁷ each represent hydrogen or the group

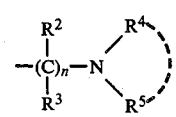

and n represents an integer from 2 to 6, to form a polyisocyanate addition product which addition product is combined with, coated with or applied to another different material.

11. A polyisocyanate addition composite product obtained by (a) reacting a compound having at least two isocyanate-reactive hydrogen atoms and a molecular weight of from 400 to 10,000 with a polyisocyanate in the presence of a catalyst which is a diffusion stable amino alkyl urea having tertiary amino groups corresponding to the formula

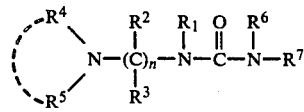

in which

R¹ represents the group

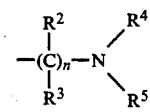

R² and R³ each represent hydrogen or a C₁-C₄ alkyl group,

R⁴ and R⁵ together represent a C₂-C₆ alkylene group which may contain heteroatoms or the group NR in which R represents an alkyl group or the group

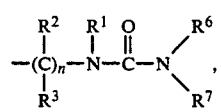

R⁶ and R⁷ each represent hydrogen or the group

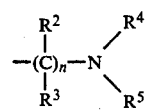

and n represents an integer from 2 to 6, to form a polyisocyanate addition product and (b) combining the polyisocyanate addition product of (a) with another material selected from the group consisting of polyvinyl chlorides, ABS, mixtures of polyvinyl chlorides and ABS, polyvinyl acetates, polyvinyl butyrals, copolymers and homopolymers based on vinylchlorides, styrene, butadiene, chloroprene, dichlorobutadiene, ethylene, propene, acrylonitrile and the chlorination and chlorosulfonation derivatives thereof, lacquers based on cellulose esters, cellulose ethers, polyester resins, epoxide resins, alkyd resins, oil lacquers, textiles and any combinations thereof which material is in the form of a foil, covering or edging.

12. A foam composite polyisocyanate addition product which is obtained by reacting (a) a compound having at least two isocyanate-reactive hydrogen atoms and a molecular weight of from 400 to 10,000 with (b) a polyisocyanate in the presence of (c) a catalyst which is a diffusion stable amino alkyl urea having tertiary amino groups corresponding to the formula

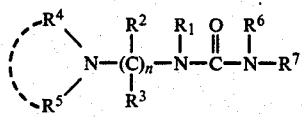

in which
R¹ represents the group

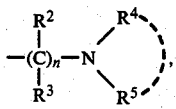

R² and R³ each represent hydrogen or a $C_1$-$C_6$ alkyl group,
R⁴ and R⁵ together represent a $C_2$-$C_6$ alkylene group which may contain heteroatoms or the group NR in which
R represents an alkyl group or the group

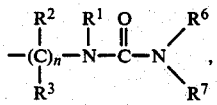

R⁶ and R⁷ each represent hydrogen or the group

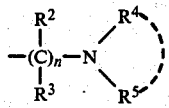

and
n represents an integer from 2 to 6, (d) a blowing agent and (e) a material selected from the group consisting of polyvinyl chlorides, ABS, mixtures of polyvinyl chlorides and ABS, polyvinyl acetates, polyvinyl butyrals, copolymers and homopolymers based on vinylchlorides, styrene, butadiene, chloroprene, dichlorobutadiene, ethylene, propene, acrylonitrile and the chlorination and chlorosulfonation derivatives thereof, lacquers based on cellulose esters, cellulose ethers, polyester resins, epoxide resins, alkyd resins, oil lacquers, textiles and any combinations thereof in a mold in a single step.

13. A process for the production of a composite polyisocyanate addition product in which a compound having at least two isocyanate-reactive hydrogen atoms and a molecular weight of from 400 to 10,000 is reacted with a polyisocyanate in the presence of a catalyst which is a diffusion stable amino alkyl urea having tertiary amino groups and corresponds to the formula

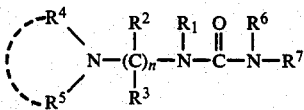

in which
R¹ represents hydrogen,
R² and R³ each represent hydrogen or a $C_1$-$C_6$ alkyl group, R⁴ and R⁵ each represent a $C_1$-$C_6$ alkyl group,
R⁶ and R⁷ each represent the group

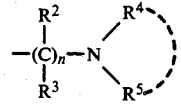

and
n represents an integer from 2 to 6
to form a polyisocyanate addition product which addition product is combined with, coated with or applied to another different material.

14. A polyisocyanate addition composite product obtained by
(a) reacting a compound having at least two isocyanate-reactive hydrogen atoms and a molecular weight of from 400 to 10,000 with a polyisocyanate in the presence of a catalyst which is a diffusion stable amino alkyl urea having tertiary amino groups corresponding to the formula

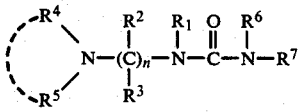

in which
R¹ represents hydrogen,
R² and R³ each represent hydrogen or a $C_1$-$C_6$ alkyl group,
R⁴ and R⁵ each represent a $C_1$-$C_6$ alkyl group,
R⁶ and R⁷ each represent the group

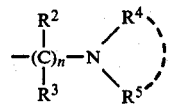

and
n represents an integer from 2 to 6
to form a polyisocyanate addition product and
(b) combining the polyisocyanate addition product of (a) with another material selected from the group consisting of polyvinyl chlorides, ABS, mixtures of polyvinyl chlorides and ABS, polyvinyl acetates, polyvinyl butyrals, copolymers and homopolymers based on vinylchlorides, styrene, butadiene, chloroprene, dichlorobutadiene, ethylene, propene, acrylonitrile and the chlorination and chlorosulfonation derivatives thereof, lacquers based on cellulose esters, cellulose ethers, polyester resins, epoxide resins, alkyd resins, oil lacquers, textiles and any combinations thereof which material is in the form of a foil, covering or edging.

15. A foamed composite polyisocyanate addition product which is obtained by reacting (a) a compound having at least two isocyanate-reactive hydrogen atoms and a molecular weight of from 400 to 10,000 with (b) a polyisocyanate in the presence of (c) a catalyst which is a diffusion stable amino alkyl urea having tertiary amino groups corresponding to the formula

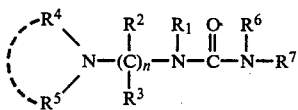

in which
R¹ represents hydrogen,
R² and R³ each represent hydrogen or a $C_1$-$C_6$ alkyl group,
R⁴ and R⁵ each represent a $C_1$-$C_6$ alkyl group,
R⁶ and R⁷ each represent the group

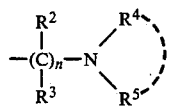

and n represents an integer from 2 to 6, (d) a blowing agent and (e) a material selected from the group consisting of polyvinyl chlorides, ABS, mixtures of polyvinyl chlorides and ABS, polyvinyl acetates, polyvinyl butyrals, copolymers and homopolymers based on vinylchlorides, styrene, butadiene, chloroprene, dichlorobutadiene, ethylene, propene, acrylonitrile and the chlorination and chlorosulfonation derivatives thereof, lacquers based on cellulose esters, cellulose ethers, polyester resins, epoxide resins, alkyd resins, oil lacquers, textiles and any combinations thereof in a mold in a single step.

16. A process for the production of a composite polyisocyanate addition product in which a compound having at least two isocyanate-reactive hydrogen atoms and a molecular weight of from 400 to 10,000 is reacted with a polyisocyanate in the presence of a catalyst corresponding to the formula

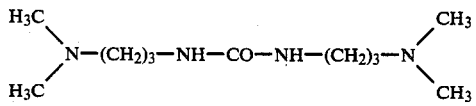

to form a polyisocyanate addition product which addition product is combined with, coated with or applied to another different material.

17. A process for the production of a composite polyisocyanate addition product in which a compound having at least two isocyanate-reactive hydrogen atoms and a molecular weight of from 400 to 10,000 is reacted with a polyisocyanate in the presence of a catalyst corresponding to the formula

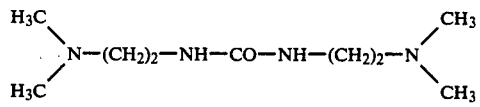

to form a polyisocyanate addition product which addition product is combined with, coated with or applied to another different material.

18. A process for the production of a composite polyisocyanate addition product in which a compound having at least two isocyanate-reactive hydrogen atoms and a molecular weight of from 400 to 10,000 is reacted with a polyisocyanate in the presence of a catalyst corresponding to the formula

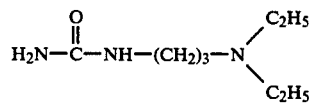

to form a polyisocyanate addition product which addition product is combined with, coated with or applied to another different material.

19. The product of the process of claim 16.
20. The product of the process of claim 17.
21. The product of the process of claim 18.
22. A process for the production of a composite polyisocyanate addition product in which a compound having at least two isocyanate-reactive hydrogen atoms and a molecular weight of from 400 to 10,000 is reacted with a polyisocyanate in the presence of a catalyst corresponding to the formula

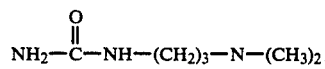

to form a polyisocyanate addition product which addition product is combined with, coated with or applied to another different material.

23. The product of the process of claim 22.

* * * * *